United States Patent
An (10) Patent No.: US 12,437,038 B2
(45) Date of Patent: Oct. 7, 2025

(54) SECURITY VERIFICATION DEVICES AND SECURITY VERIFICATION METHODS, APPARATUSES, AND MEDIA

(71) Applicant: Alipay (Hangzhou) Information Technology Co., Ltd., Zhejiang (CN)

(72) Inventor: Wei An, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 126 days.

(21) Appl. No.: 18/529,168

(22) Filed: Dec. 5, 2023

(65) Prior Publication Data

US 2024/0220590 A1     Jul. 4, 2024

(30) Foreign Application Priority Data

Dec. 30, 2022 (CN) .................. 202211738951.X (51) Int. Cl.
*G06F 21/31* (2013.01)

(52) U.S. Cl.
CPC .................. *G06F 21/31* (2013.01)

(58) Field of Classification Search
CPC .................. G06F 21/31; G06F 21/46
See application file for complete search history.

(56) References Cited

U.S. PATENT DOCUMENTS

| | | | |
|---|---|---|---|
| 6,509,847 B1 * | 1/2003 | Anderson | G06F 3/04883 178/18.01 |
| 7,740,371 B1 * | 6/2010 | Lebens | H05B 45/10 362/802 |
| 8,869,448 B1 * | 10/2014 | Lee | E05F 15/74 49/13 |
| 9,030,293 B1 * | 5/2015 | Tabak | G06F 21/30 340/5.54 |
| 10,073,990 B1 * | 9/2018 | Shieh | G06F 1/26 |
| 10,121,026 B1 * | 11/2018 | Ryland | H05K 7/1414 |
| 10,257,229 B1 * | 4/2019 | Kuo | H04L 63/20 |
| 10,546,266 B1 * | 1/2020 | Bose | H04L 67/52 |
| 10,604,274 B1 * | 3/2020 | Zaehring | G06F 1/1601 |
| 10,965,464 B1 * | 3/2021 | Reddy | G06F 3/016 |
| 11,282,317 B1 * | 3/2022 | Curelar | G07C 9/00912 |
| 11,792,011 B1 * | 10/2023 | Reddy | G06F 3/0488 713/186 |
| 12,032,973 B1 * | 7/2024 | Mars | G06F 9/4451 |
| 12,271,462 B1 * | 4/2025 | Lyle | H04N 7/15 |
| 12,314,369 B2 * | 5/2025 | Kim | G06F 21/602 |
| 2002/0021601 A1 * | 2/2002 | Chornenky | G07C 9/00182 365/200 |
| 2003/0098774 A1 * | 5/2003 | Chornenky | G07C 9/37 340/5.1 |

(Continued)

*Primary Examiner* — Aravind K Moorthy
(74) *Attorney, Agent, or Firm* — Fish & Richardson P.C.

(57) ABSTRACT

This specification discloses methods, apparatuses, systems, and media for security verification. In an example, an input/output apparatus is disposed on a front panel of an electronic device. In response to a user performs an operation on the input/output apparatus, the input/output apparatus determines an electrical signal corresponding to the operation, and sends the electrical signal to a verification apparatus. The verification apparatus verifies, based on a pre-stored verification password, a Morse code that is input by the user and that is determined based on the electrical signal, and sends a release instruction to a locking mechanism of the electronic device in response to that the verification succeeds such that the locking mechanism releases physical locking of the electronic device.

20 Claims, 6 Drawing Sheets

(56) References Cited

U.S. PATENT DOCUMENTS

| | | | | |
|---|---|---|---|---|
| 2004/0172562 A1* | 9/2004 | Berger | G06F 21/316 | 726/7 |
| 2004/0233046 A1* | 11/2004 | Gotfried | B60R 25/25 | 340/426.1 |
| 2004/0233053 A1* | 11/2004 | Liao | G08B 7/062 | 340/539.1 |
| 2006/0282633 A1* | 12/2006 | Iwai | G06F 21/80 | 711/163 |
| 2007/0228160 A1* | 10/2007 | Takayanagi | G07F 7/0866 | 235/492 |
| 2007/0250920 A1* | 10/2007 | Lindsay | G06F 21/31 | 726/7 |
| 2008/0089554 A1* | 4/2008 | Tabankin | H04N 1/32203 | 348/E5.042 |
| 2008/0136678 A1* | 6/2008 | Harrington | G07C 9/33 | 341/20 |
| 2008/0162848 A1* | 7/2008 | Broyles | G06F 12/1433 | 711/E12.1 |
| 2008/0244759 A1* | 10/2008 | Cao | G06F 21/88 | 726/34 |
| 2008/0298558 A1* | 12/2008 | Rondeau | H04M 11/025 | 379/88.19 |
| 2010/0042690 A1* | 2/2010 | Wall | H04L 51/18 | 709/206 |
| 2010/0066487 A1* | 3/2010 | Bell | B60R 25/00 | 340/5.6 |
| 2012/0042377 A1* | 2/2012 | Chen | H04L 9/3234 | 726/19 |
| 2013/0052979 A1* | 2/2013 | Chiang | G06F 21/31 | 455/404.1 |
| 2013/0106570 A1* | 5/2013 | Lee | G07C 9/33 | 340/5.54 |
| 2013/0167224 A1* | 6/2013 | Horiuchi | G06F 21/45 | 726/18 |
| 2013/0179681 A1* | 7/2013 | Benson | G06Q 20/38215 | 713/155 |
| 2013/0187773 A1* | 7/2013 | Tsou | G07F 19/201 | 340/5.53 |
| 2013/0305353 A1* | 11/2013 | McMillan | G06F 21/31 | 726/19 |
| 2014/0009262 A1* | 1/2014 | Robertson | A61B 5/332 | 340/5.82 |
| 2014/0062653 A1* | 3/2014 | Park | H04W 12/06 | 340/5.54 |
| 2014/0096210 A1* | 4/2014 | Dabbiere | H04L 63/0861 | 726/5 |
| 2014/0181183 A1* | 6/2014 | Houjou | H04M 1/72412 | 709/203 |
| 2014/0253461 A1* | 9/2014 | Hicks | G06F 3/03545 | 345/173 |
| 2014/0352521 A1* | 12/2014 | Takahashi | G04F 5/025 | 84/484 |
| 2015/0012886 A1* | 1/2015 | Lu | H04M 1/67 | 715/835 |
| 2015/0096012 A1* | 4/2015 | Chen | G06F 21/84 | 726/17 |
| 2015/0106261 A1* | 4/2015 | Shmulevsky | G07F 17/12 | 705/40 |
| 2015/0163658 A1* | 6/2015 | Julian | H04W 8/02 | 455/420 |
| 2015/0261949 A1* | 9/2015 | Mori | G06F 21/31 | 726/19 |
| 2015/0277559 A1* | 10/2015 | Vescovi | G06F 1/163 | 345/173 |
| 2015/0347728 A1* | 12/2015 | Holyoake | G06F 21/31 | 726/18 |
| 2015/0347733 A1* | 12/2015 | Tsou | G06V 40/18 | 726/18 |
| 2015/0362997 A1* | 12/2015 | Hatton | G06F 3/014 | 701/2 |
| 2016/0026307 A1* | 1/2016 | Wu | G09G 5/003 | 345/174 |
| 2016/0225204 A1* | 8/2016 | Grziwok | F16M 11/14 | |
| 2016/0250486 A1* | 9/2016 | Yoder | G16Z 99/00 | 340/870.07 |
| 2017/0018150 A1* | 1/2017 | Kim | G07C 9/00174 | |
| 2017/0034485 A1* | 2/2017 | Scalisi | G07C 9/00309 | |
| 2017/0110889 A1* | 4/2017 | Bell | H04W 4/80 | |
| 2017/0124792 A1* | 5/2017 | Schoenfelder | G07C 9/00857 | |
| 2017/0140135 A1* | 5/2017 | Zhao | G06F 21/6218 | |
| 2017/0181559 A1* | 6/2017 | Lee | G07C 9/33 | |
| 2017/0280109 A1* | 9/2017 | Scalisi | H04N 23/667 | |
| 2017/0301162 A1* | 10/2017 | Radicella | G07C 9/00182 | |
| 2017/0372546 A1* | 12/2017 | Haruna | G07C 9/00174 | |
| 2018/0126953 A1* | 5/2018 | Meier | B60R 25/40 | |
| 2018/0308303 A1* | 10/2018 | Esposito | G07C 9/27 | |
| 2018/0319407 A1* | 11/2018 | Lisseman | G06V 20/597 | |
| 2019/0034606 A1* | 1/2019 | Mapen | G06F 21/36 | |
| 2019/0122471 A1* | 4/2019 | Tamane | B60R 25/2045 | |
| 2019/0243959 A1* | 8/2019 | Radoslaw | G04G 21/00 | |
| 2019/0303556 A1* | 10/2019 | Jain | G06F 21/35 | |
| 2019/0306679 A1* | 10/2019 | Duan | B60Q 9/00 | |
| 2019/0335817 A1* | 11/2019 | Freeman | G01N 21/85 | |
| 2019/0378398 A1* | 12/2019 | Snakenberg | G08B 25/10 | |
| 2019/0389428 A1* | 12/2019 | Liu | B60R 25/246 | |
| 2020/0019244 A1* | 1/2020 | Bench | G06F 3/023 | |
| 2020/0216018 A1* | 7/2020 | Takano | B63H 21/21 | |
| 2020/0218418 A1* | 7/2020 | Zarraga | G06F 3/04144 | |
| 2020/0223394 A1* | 7/2020 | Tamaru | B60R 25/40 | |
| 2020/0304508 A1* | 9/2020 | Bae | H04L 63/0876 | |
| 2020/0309551 A1* | 10/2020 | Yang | G06Q 10/02 | |
| 2020/0319754 A1* | 10/2020 | Hwang | G06F 3/0485 | |
| 2020/0380099 A1* | 12/2020 | Ridgill, II | G06F 21/31 | |
| 2020/0382954 A1* | 12/2020 | Chazot | H04L 9/14 | |
| 2021/0020810 A1* | 1/2021 | Lius | G06V 40/1318 | |
| 2021/0090368 A1* | 3/2021 | Glogovsky | E05G 1/10 | |
| 2021/0099599 A1* | 4/2021 | Han | H04N 1/00411 | |
| 2021/0192032 A1* | 6/2021 | Seroussi | G06N 20/00 | |
| 2021/0266315 A1* | 8/2021 | Tav | G06F 3/013 | |
| 2021/0297412 A1* | 9/2021 | Thayyilsubramanian | G06Q 20/4014 | |
| 2021/0321262 A1* | 10/2021 | Inami | H04W 12/50 | |
| 2021/0339704 A1* | 11/2021 | Rathi | B60R 25/20 | |
| 2021/0365533 A1* | 11/2021 | Kaplan | G06N 3/08 | |
| 2021/0377250 A1* | 12/2021 | Hitomi | H04L 63/102 | |
| 2022/0074234 A1* | 3/2022 | Chen | E05B 47/0012 | |
| 2022/0166507 A1* | 5/2022 | Newman | H04B 10/114 | |
| 2022/0172729 A1* | 6/2022 | Mohajer | G06F 3/167 | |
| 2022/0182379 A1* | 6/2022 | Budman | G06F 3/017 | |
| 2022/0331690 A1* | 10/2022 | Kwak | A63F 13/77 | |
| 2022/0355121 A1* | 11/2022 | Zygorodimos | A61N 1/37252 | |
| 2022/0368556 A1* | 11/2022 | Scalisi | H04N 23/661 | |
| 2022/0376799 A1* | 11/2022 | Dussaume | H04B 13/005 | |
| 2022/0405370 A1* | 12/2022 | Lee | G06F 3/015 | |
| 2023/0019284 A1* | 1/2023 | Seger, Jr. | G06F 3/0441 | |
| 2023/0047088 A1* | 2/2023 | Blasband | H04L 9/0897 | |
| 2023/0071124 A1* | 3/2023 | Tatsumoto | G06Q 10/0836 | |
| 2023/0071312 A1* | 3/2023 | Preciado | H04L 9/3234 | |
| 2023/0114336 A1* | 4/2023 | Lee | G06Q 20/4014 | 705/44 |
| 2023/0118816 A1* | 4/2023 | Brown | G08B 25/008 | 340/5.61 |
| 2023/0126289 A1* | 4/2023 | Tasaki | G08G 1/205 | 370/320 |
| 2023/0131744 A1* | 4/2023 | Liu | G06F 21/44 | 726/17 |
| 2023/0177901 A1* | 6/2023 | Lima | G07C 9/00309 | 340/5.61 |
| 2023/0198982 A1* | 6/2023 | Lee | H04L 63/18 | 726/3 |
| 2023/0223031 A1* | 7/2023 | Sharifi | G10L 17/24 | 704/246 |
| 2023/0395182 A1* | 12/2023 | Schaefer | G11C 29/52 | |
| 2024/0013600 A1* | 1/2024 | Jung | B60R 25/01 | |
| 2024/0070244 A1* | 2/2024 | Matsuura | G06F 21/44 | |
| 2024/0080649 A1* | 3/2024 | Bidkar | H04W 4/80 | |

* cited by examiner

SECURITY VERIFICATION DEVICES AND SECURITY VERIFICATION METHODS, APPARATUSES, AND MEDIA

CROSS-REFERENCE TO RELATED APPLICATIONS

This application claims priority to Chinese Patent Application No. 202211738951.X, filed on Dec. 30, 2022, which is hereby incorporated by reference in its entirety.

TECHNICAL FIELD

This specification relates to the field of computer technologies, and in particular, to security verification devices and security verification methods, apparatuses, and media.

BACKGROUND

At present, with development of computer technologies, a need for deep service integration, and increasing attention to privacy data of people, information security of electronic devices that store sensitive data also attracts wide attention. The sensitive data can include personal privacy data, enterprise sensitive data, etc. The electronic device can be a server, a switch, etc.

Generally, the electronic device needs to be maintained periodically. How to perform identity authentication on maintenance personnel has become one of the issues that need to be addressed currently. Based on the above-mentioned description, this specification provides security verification devices for the electronic devices.

SUMMARY

This specification provides security verification methods and apparatuses, readable storage media, and electronic devices, so as to partially alleviate the above-mentioned problems in a conventional technology.

The following technical solutions are used in this specification.

This specification provides a security verification device, where the security verification device 100 is deployed in an electronic device 104, the security verification device 100 includes an input/output unit 101 and a verification unit 102, the input/output unit 101 is deployed on a front panel of the electronic device 104, the verification unit 102 is deployed in the electronic device 104, and a locking mechanism 103 is deployed in the electronic device 104, where the input/output unit 101 is configured to: in response to an operation performed by a user on the input/output unit 101, determine an electrical signal corresponding to the operation, and send the electrical signal to the verification unit 102; and the verification unit 102 is configured to: determine, based on the received electrical signal, a Morse code input by the user, and verify the Morse code based on a pre-stored verification password corresponding to the electronic device 104; and in response to that the verification succeeds, send a release instruction to the locking mechanism 103 such that the locking mechanism 103 releases physical locking of the electronic device 104 based on the release instruction.

This specification provides a security verification method, where the security verification method is applied to a security verification device, the security verification device is deployed in an electronic device, the security verification device includes an input/output unit and a verification unit, the input/output unit is deployed on a front panel of the electronic device, the verification unit is deployed in the electronic device, and a locking mechanism is deployed in the electronic device; the method includes: in response to an operation performed by a user on the input/output unit, determining, by using the input/output unit, an electrical signal corresponding to the operation, and sending the electrical signal to the verification unit; determining, by using the verification unit and based on the electrical signal, a Morse code input by the user, and verifying the Morse code based on a pre-stored verification password corresponding to the electronic device; and in response to that the verification succeeds, sending a release instruction to the locking mechanism such that the locking mechanism releases physical locking of the electronic device based on the release instruction.

This specification provides a security verification system, where the security verification system includes a security verification device and a central control device, the central control device stores a verification password corresponding to an electronic device, the central control device communicates with a verification unit in the security verification device, the security verification device includes an input/output unit and the verification unit, the input/output unit is a single key, the input/output unit is deployed on a front panel of the electronic device, the verification unit is deployed in the electronic device, and a locking mechanism is deployed in the electronic device, where the central control device is configured to send the verification password to the verification unit based on a predetermined specified time period and the verification password corresponding to the electronic device, and send, to a user, a maintenance instruction that includes the verification password, so as to prompt the user to perform a physical operation on the electronic device based on the verification password in the specified time period; the verification unit is configured to: receive and store the verification password sent by the central control device; determine, based on a received electrical signal, a Morse code input by the user, and verify the Morse code based on the stored verification password corresponding to the electronic device; and in response to that the verification succeeds, send a release instruction to the locking mechanism such that the locking mechanism releases physical locking of the electronic device based on the release instruction; and the input/output unit is configured to: in response to an operation performed by the user on the input/output unit, determine an electrical signal corresponding to the operation, and send the electrical signal to the verification unit.

This specification provides a security verification apparatus, where the security verification apparatus is applied to a security verification device, the security verification device is deployed in an electronic device, the security verification device includes an input/output unit and a verification unit, the input/output unit is deployed on a front panel of the electronic device, the verification unit is deployed in the electronic device, and a locking mechanism is deployed in the electronic device; the apparatus includes: an input/output module, configured to: in response to an operation performed by a user on the input/output unit, determine, by using the input/output unit, an electrical signal corresponding to the operation, and send the electrical signal to the verification unit; a verification module, configured to determine, by using the verification unit and based on the electrical signal, a Morse code input by the user, and verify the Morse code based on a pre-stored verification password corresponding to the electronic device; and a releasing module, configured to: in response to that the verification succeeds, send a release instruction to the locking mechanism such that the locking mechanism releases physical locking of the electronic device based on the release instruction.

This specification provides a computer-readable storage medium, where the storage medium stores a computer program, and the computer program is executed by a processor to implement the above-mentioned security verification method.

This specification provides an electronic device, including a memory, a processor, and a computer program that is stored in the memory and that can run on the processor, where the processor executes the program to implement the above-mentioned security verification method.

At least one of the above-mentioned technical solutions used in this specification can achieve the following beneficial effects:

An input/output unit is disposed on a front panel of an electronic device. When a user performs an operation on the input/output unit, the input/output unit determines an electrical signal corresponding to the operation, and sends the electrical signal to a verification unit. The verification unit verifies, based on a pre-stored verification password, a Morse code that is input by the user and that is determined based on the electrical signal, and sends a release instruction to a locking mechanism of the electronic device when the verification succeeds such that the locking mechanism releases physical locking of the electronic device.

In this solution, an identity of the user is authenticated using the Morse code input by the user, and physical locking of the electronic device is released when the authentication succeeds, thereby ensuring information security of the electronic device.

BRIEF DESCRIPTION OF DRAWINGS

The accompanying drawings described here are intended to provide a further understanding of this specification, and constitute a part of this specification. Some example embodiments of this specification and the descriptions of the example embodiments are intended to explain this specification, and do not constitute an undue limitation on this specification. In the accompanying drawings.

DESCRIPTION OF EMBODIMENTS

To make the objectives, technical solutions, and advantages of this specification clearer, the following clearly and comprehensively describes the technical solutions of this specification with reference to some specific embodiments and corresponding accompanying drawings of this specification. Clearly, the described embodiments are merely some but not all of embodiments of this specification. All other embodiments obtained by a person of ordinary skill in the art based on some embodiments of this specification without creative efforts shall fall within the protection scope of this specification.

The following describes in detail the technical solutions provided in some embodiments of this specification with reference to the accompanying drawings.

Figure 1:
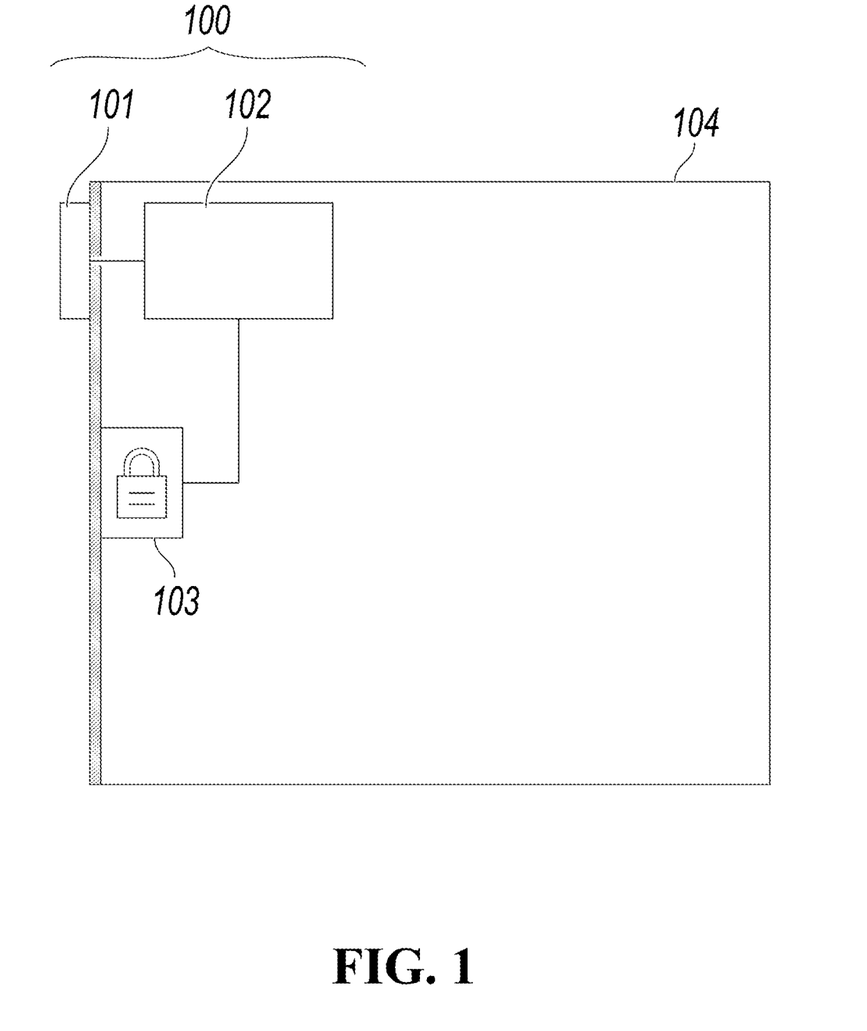
FIG. 1 is a schematic structural diagram illustrating a security verification device, according to this specification.

FIG. 1 is a schematic structural diagram illustrating a security verification device, according to this specification. The security verification device 100 includes an input/output unit 101 and a verification unit 102.

In terms of hardware, in one or more embodiments provided in this specification, the input/output unit 101 in the security verification device 100 is an apparatus for converting an operation performed by the user on the input/output unit 101 into an electrical signal in response to the operation performed by the user on the input/output unit 101. The apparatus can be a key, a keypad, an input board, a voice input apparatus, etc. The input/output unit 101 is connected to the verification unit 102 in the security verification device 100.

The verification unit 102 is an apparatus for verifying a Morse code input by the user by performing an operation on the input/output unit 101, and performing a subsequent step based on a verification result. The apparatus can be a microcontroller unit (MCU), a field programmable gate array (FPGA) chip, a complex programmable logic device (CPLD) chip, etc. The verification unit 102 is connected to the above-mentioned input/output unit 101 for communication. In addition, the verification unit 102 communicates with a locking mechanism 103 in the electronic device 104, so as to control the locking mechanism 103 to release locking of the electronic device 104, or maintain locking of the electronic device 104 by the locking mechanism 103.

Specifically, structures, types, security verification methods, and the like of both the input/output unit 101 and the verification unit 102 can be set based on needs, which is not limited in this specification.

Certainly, the above-mentioned security verification device 100 can be deployed in the electronic device 104, or can be deployed outside the electronic device 104. However, generally, the security verification device 100 needs to perform identity authentication on the user only when the user needs to perform a physical operation on the electronic device 104, thereby ensuring information security in the electronic device 104. The physical operation can be disassembling and assembling the electronic device 104, taking out an electronic component from the electronic device 104, or performing a plurality of operations such as dust removal, detection, and maintenance on a line, a component, and the like in the electronic device 104.

If the security verification device 100 is disposed outside the electronic device 104, a case may occur in which the user still identifies an incorrect electronic device 104 after security verification on the user succeeds. Therefore, to ensure information security of the electronic device 104, the input/output unit 101 can be deployed on a front panel of the electronic device 104, the verification unit 102 can be deployed in the electronic device 104, and the locking mechanism 103 can be deployed in the electronic device 104, thereby avoiding a case in which after security verification succeeds, the user still identifies an incorrect electronic device 104 to perform a physical operation. In addition, the verification unit 102 and the locking mechanism 103 are deployed in the electronic device 104, thereby avoiding a case in which security verification fails since the verification unit 102 and the locking mechanism 103 are damaged, thereby further ensuring information security.

For example, the electronic device 104 is a server. It is assumed that a physical operation performed by the user on the server is to maintain the server. In such case, the user needs to open a chassis of the server, and troubleshoot modules in the chassis, thereby implementing maintenance on the server. Therefore, the user can use the input/output unit 101 disposed on the front panel of the server to input a key corresponding to the server. The input/output unit 101 determines a corresponding electrical signal based on an operation performed by the user on the input/output unit 101, and sends the corresponding electrical signal to the verification unit 102 deployed in the server. The verification unit 102 determines, based on the electrical signal, a Morse code input by the user, and further verifies the Morse code based on a verification password that corresponds to the server and that is pre-stored in the verification unit 102, thereby implementing security management on the server.

Certainly, the above-mentioned security verification device 100 can be deployed on the same circuit board as the locking mechanism 103 in the electronic device 104, or can be disposed on a different circuit board from the above-mentioned locking mechanism 103, and be connected to the locking mechanism 103 by using a cable, an I/O bus, or the like, to implement data transmission between a channel management unit and a to-be-verified device. Specifically, a method for disposing the security verification device 100 can be set based on needs, which is not limited in this specification.

In one or more embodiments provided in this specification, a basis for the security verification device 100 to implement security verification on the electronic device 104 is as follows: The security verification device 100 includes an input/output unit 101, and the user can perform an operation on the input/output unit 101 deployed on the front panel of the electronic device 104. As such, the input/output unit 101 converts the operation into an electrical signal, and sends the electrical signal to the verification unit 102. The verification unit 102 determines, based on the received electrical signal, a Morse code input by the user, and then verifies the Morse code based on a pre-stored verification password. When the verification succeeds, the verification unit 102 releases the locking mechanism 103 of the electronic device 104.

Based on the above-mentioned description, the input/output unit 101 can monitor the operation performed by the user on the input/output unit 101, and determine an electrical signal corresponding to the operation based on the detected operation of the user.

For example, the input/output unit 101 is a single key. In such case, the operation corresponding to the user can include short presses, long presses, multiple consecutive presses of the key, and so on. For example, the input/output unit 101 is two keys, and one of the two keys represents a long press, and the other key represents a short press. In such case, the operation corresponding to the user can be pressing the key that represents the long press, and/or pressing the key that represents the short press. For example, the input/output unit 101 is a keypad. In such case, the operation performed by the user on the input/output unit 101 can be pressing a symbol in the keypad. Specifically, a type of the input/output unit 101 and how the user performs an operation on the input/output unit 101 can be set based on needs, which is not limited in this specification.

After the user performs the operation on the input/output unit 101, the input/output unit 101 can convert the operation into an electrical signal, and send the electrical signal to the verification unit 102.

For each operation, the input/output unit 101 can convert the operation into an electrical signal corresponding to the operation.

For example, the input/output unit 101 is a single key. In such case, it can be specified in advance that, when the user performs an operation on the single key, the input/output unit 101 generates an electrical signal of a first voltage level, or when the user performs no operation on the single key, the input/output unit 101 does not generate an electrical signal. Therefore, when the user performs an operation on the input/output unit 101, the input/output unit 101 can generate a corresponding electrical signal of a first voltage level, and send the electrical signal to the verification unit 102.

For example, the input/output unit 101 is two keys. In such case, it can be specified in advance that, when the user performs an operation on the key that represents "a long press", the input/output unit 101 generates an electrical signal of a first voltage level, or when the user performs an operation on the key that represents "a short press", the input/output unit 101 generates an electrical signal of a second voltage level. Therefore, when the user performs an operation on the input/output unit 101, the input/output unit 101 can generate a corresponding electrical signal and send the electrical signal to the verification unit 102.

However, as described above, a basis for the security verification device 100 in this specification to implement security verification on the electronic device 104 is as follows: The user can input a Morse code by using the input/output unit 101, and the verification unit 102 can verify, based on a predetermined verification password, the Morse code input by the user. Based on the above-mentioned description, the verification unit 102 can receive an electrical signal sent by the input/output unit 101, and determine a Morse code corresponding to the electrical signal.

Specifically, if the input/output unit 101 is a single key, the verification unit 102 can determine, based on duration of the received electrical signal of the first voltage level, the Morse code input by the user. If the input/output unit 101102 is two keys, the verification unit 102 can determine, based on the received electrical signal of the first voltage level and the received electrical signal of the second voltage level, the Morse code input by the user. If the input/output unit 101 is a keypad, the verification unit 102 can determine, based on a predetermined mapping relationship between each key in the keypad and an electrical level, and a predetermined mapping relationship between an electrical level and a Morse code, the Morse code input by the user.

Specifically, how the verification unit 102 determines, based on the electrical signal, the Morse code input by the user can be set based on needs, which is not limited in this specification.

After determining the Morse code input by the user, the verification unit 102 can verify the Morse code based on a pre-stored verification password corresponding to the electronic device 104. The verification password can be in a form of a Morse code. Therefore, the verification unit 102 can compare the Morse code input by the user with the verification password corresponding to the electronic device 104 to determine whether the Morse code input by the user is consistent with the verification password corresponding to the electronic device 104. If the Morse code input by the user is consistent with the verification password corresponding to the electronic device 104, it is considered that the verification of the Morse code succeeds. If the Morse code input by the user is inconsistent with the verification password corresponding to the electronic device 104, it is considered that the verification fails.

In addition, in this specification, to avoid a case in which the security verification device 100 is disassembled, and consequently, a verification password of the electronic device 104 is stolen, and information in the electronic device 104 is leaked, an encoding algorithm can be further set in the electronic device 104. The encoding algorithm is used to encode or decode the Morse code input by the user, to obtain a string code block corresponding to the Morse code. Therefore, after determining the Morse code input by the user, the security verification device 100 can obtain a string code corresponding to the Morse code by using the predetermined encoding algorithm, and verify the string code based on the verification password corresponding to the electronic device 104.

Further, the user performs an operation on the input/output unit 101 for purposes of inputting a corresponding Morse code so as to perform identity authentication on the user, and further releasing physical locking of the electronic device 104 by the locking mechanism 103 in the electronic device 104 in the case of identity authentication on the user.

Based on the above-mentioned description, after the verification performed by the verification unit 102 on the Morse code succeeds, the verification unit 102 can further send a release instruction to the locking mechanism 103.

Therefore, the locking mechanism 103 in the electronic device 104 can receive the release instruction sent by the verification unit 102, and release physical locking of the electronic device 104 based on the release instruction. For example, the locking mechanism 103 is a physical lock. In such case, releasing the physical locking of the electronic device 104 by the locking mechanism 103 can be opening a physical lock corresponding to the locking mechanism 103, i.e., unlocking.

Still further, in this specification, a locking structure is deployed in the electronic device 104. The locking structure is configured to physically lock the electronic device 104 when authentication is not performed on the user and/or authentication on the user fails, so as to prevent the user from performing a physical operation such as disassembly on the electronic device 104, thereby ensuring information security of the electronic device 104. Therefore, when determining that the verification fails, the verification unit 102 can determine not to send a release instruction to the locking mechanism 103 such that the locking mechanism 103 can continue to maintain locking of the electronic device 104.

In addition, as described above, the verification failure can generally include three cases: An incorrect password is input because of an unintentional mistake of the user; a password is incorrect since the user identifies an incorrect electronic device 104; an operation of the user is a non-compliant operation.

If the user inputs an incorrect password or the user identifies an incorrect electronic device 104, the electronic device 104 needs to provide feedback to the user. If the operation of the user is a non-compliant operation, the electronic device 104 needs to give an alarm.

Based on the above-mentioned description, when the verification performed based on the Morse code of the user fails, the verification unit 102 can send alert information. The alert information can be sent to the user, can be sent to a service provider, or can be sent to both the user and the service provider. The service provider is a party that the electronic device 104 belongs to.

It is worthwhile to note that the user in this specification is a person who runs and maintains the server.

Further, to avoid an incorrect password input caused by an unintentional mistake of the user, which affects maintenance efficiency, after the user performs an operation on the input/output unit 101, the security verification device 100 can provide feedback to the user based on a type of the Morse code input by the user, so as to prompt the user to check whether the feedback information corresponds to the operation performed by the user on the input/output unit 101.

Specifically, after the Morse code is determined, the verification unit 102 can further send a feedback instruction to the input/output unit 101 based on a type of the Morse code corresponding to the electrical signal.

The input/output unit 101 can receive the feedback instruction, and display a feedback message based on the feedback instruction. The feedback message is used to prompt the user of the type of the Morse code corresponding to the operation performed by the user on the input/output unit 101. The type of the Morse code is generally a dash of the Morse code or a dot of the Morse code.

Still further, as described above, if the verification by the verification unit 102 fails, failure of the verification performed by the verification unit 102 generally includes three cases: The verification fails since the user performs an incorrect operation on the input/output unit 101 because of an unintentional mistake; the verification fails since the user identifies an incorrect electronic device 104, and performs verification based on the input/output unit 101 on the front panel of the incorrect electronic device 104; the verification fails since the user is a third party, and wants to steal information in the electronic device 104 or destroy the information in the electronic device 104, but fails to input a correct Morse code. The security verification device 100 in this specification is configured to: when the former two cases occur, provide feedback to the user in a timely manner, and further prompt the user to search for a correct electronic device 104 or input a correct Morse code in a timely manner, thereby ensuring information security of the electronic device 104.

Based on the above-mentioned description, after a security verification result is determined, the security verification device 100 can display the security verification result to the user.

Specifically, if the verification succeeds, the verification unit 102 can prompt, in a plurality of forms such as sound, light, and vibration feedback by using apparatuses such as a horn, a speaker, an LED, and a vibration motor that are connected to the verification unit 102, the electronic device 104 that the verification succeeds. Similarly, if the verification fails, the verification unit 102 can prompt, in a plurality of forms such as sound, light, and vibration feedback by using apparatuses such as a horn, a speaker, and an LED that are connected to the verification unit 102, the electronic device 104 that the verification fails.

Certainly, the verification unit 102 is deployed in the electronic device 104. Therefore, if the verification unit 102 directly provides feedback to the user, because of a box structure of the electronic device 104 or the like, the user may not receive the feedback of the verification unit 102. However, the input/output unit 101 is disposed on the front panel of the electronic device 104, and feedback on the front panel is clearer. Therefore, the input/output unit 101 can be further used to provide feedback to the user.

Specifically, if the verification succeeds, the verification unit 102 can send a second instruction to the input/output unit 101.

After receiving the second instruction, the input/output unit 101 can display a second prompt message to the user based on the second instruction. The second prompt message is used to prompt the electronic device 104 that the verification succeeds. The first prompt message can be in a plurality of forms such as sound, light, and vibration feedback.

If the verification fails, the verification unit 102 can send a third instruction to the input/output unit 101.

After receiving the third instruction, the input/output unit 101 can display a third prompt message to the user based on the third instruction. The third prompt message is used to prompt the electronic device 104 that the verification fails. Like the second prompt message, the third prompt message can also be in a plurality of forms such as sound, light, and vibration feedback.

Based on the security verification apparatus shown in FIG. 1, an input/output unit is disposed on a front panel of an electronic device. When a user performs an operation on the input/output unit, the input/output unit determines an electrical signal corresponding to the operation, and sends the electrical signal to a verification unit. The verification unit verifies, based on a pre-stored verification password, a Morse code that is input by the user and that is determined based on the electrical signal, and sends a release instruction to a locking mechanism of the electronic device when the verification succeeds such that the locking mechanism releases physical locking of the electronic device. In this solution, an identity of the user is authenticated using the Morse code input by the user, and physical locking of the electronic device is released when the authentication succeeds, thereby ensuring information security of the electronic device.

Further, to ensure password security, the verification password can alternatively be sent in real time to the verification unit 102 by the central control device 105. The central control device 105 is a device for controlling the verification password of the electronic device 104. Therefore, the central control device 105 can send a verification instruction to the verification unit 102. The verification instruction includes the verification password corresponding to the electronic device 104.

Therefore, the verification unit 102 can receive the verification instruction sent by the central control device 105, determine the verification password of the electronic device 104 based on the verification instruction, and store the determined verification password.

After storing the verification password, the verification unit 102 can verify, based on the verification password, a Morse code that is input by the user and that is determined based on an electrical signal subsequently sent by the input/output unit 101. The central control device 105 can further store verification passwords of a plurality of electronic devices 104. In such case, when storing the verification passwords corresponding to the electronic devices 104, the central control device 105 can further store the verification password corresponding to each electronic device 104 based on a mapping relationship between the electronic device 104 and the verification password.

Figure 2:
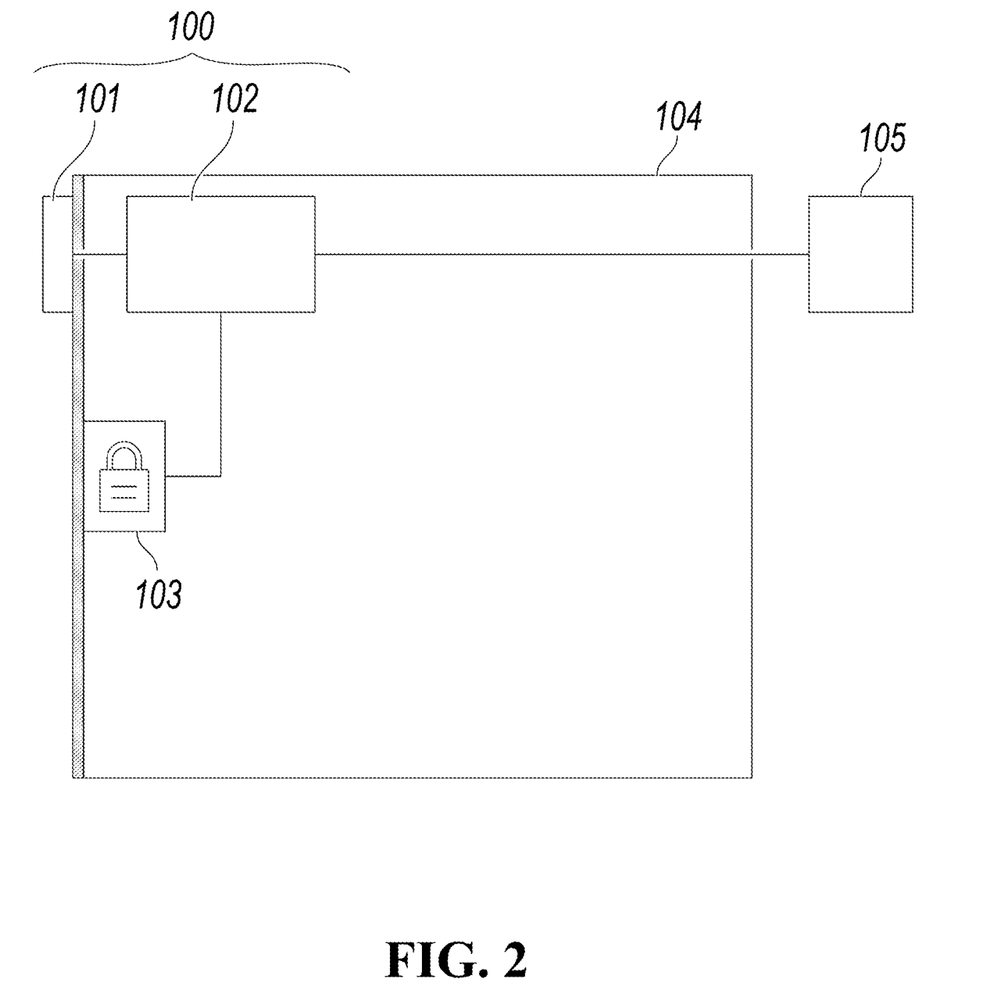
FIG. 2 is a schematic structural diagram illustrating a security verification device, according to this specification.

Based on the same idea, this specification further provides a schematic structural diagram illustrating a security verification device 100, as shown in FIG. 2.

FIG. 2 is a schematic structural diagram illustrating a security verification device according to this specification.

In the figure, 100 represents a security verification device, 101 represents an input/output unit, 102 represents a verification unit, 103 represents a locking mechanism, 104 represents an electronic device, and 105 represents a central control device. The central control device 105 stores a verification password corresponding to the electronic device 104. In such case, the central control device 105 can communicate with the verification unit 102. To be specific, the central control device 105 sends a verification instruction to the verification unit 102.

Still further, to prevent the user from identifying an incorrect electronic device 104 to perform a physical operation, the electronic device 104 that needs to be maintained can further give a prompt to the user.

Specifically, after receiving the verification instruction, the verification unit 102 can send a first instruction to the input/output unit 101 based on the verification instruction.

The input/output unit 101 can receive the first instruction, and display a first prompt message based on the first instruction. The first prompt information is used to prompt the user that the electronic device 104 in which the verification unit 102 is located, i.e., the electronic device 104 in which the security verification device 100 is located needs to perform a physical operation.

In addition, a server room generally includes a large quantity of electronic devices 104. Therefore, to ensure maintenance efficiency corresponding to each electronic device 104, the central control device 105 can further store an operation and maintenance plan. The operation and maintenance plan includes at least some of the electronic devices 104 and operation and maintenance time periods respectively corresponding to the at least some of the electronic devices 104.

Therefore, the central control device 105 can further send a specified time period to the verification unit 102.

The verification unit 102 can receive and store the specified time period. The specified time period is a time period in which the electronic device 104 needs to perform a physical operation.

Therefore, when a current moment reaches a start moment of the specified time period, the verification unit 102 can send a first instruction to the input/output unit 101.

The input/output unit 101 can receive the first instruction, and display a first prompt message based on the first instruction, so as to prompt the user that the electronic device 104 in which the verification unit 102 is located, i.e., the electronic device 104 in which the security verification device 100 is located needs to perform a physical operation, i.e., needs to perform operation and maintenance.

Further, in the same area, a plurality of electronic devices 104 may need to perform physical operations, and the physical operations corresponding to the electronic devices 104 are not completely the same.

Therefore, for each electronic device 104, when the user needs to perform an operation on the electronic device 104, security verification can be further performed. After the security verification, the user performs a physical operation on the electronic device 104.

Therefore, after determining the electronic device 104 that needs to perform the physical operation, the user can input, based on a predetermined physical operation password corresponding to the electronic device 104, the physical operation password by using the input/output unit 101. The physical operation password can be predetermined by the user.

Still further, to ensure information security of the electronic device 104 and avoid information leakage caused by stealing of a password, in this specification, when it is determined that the user needs to perform an operation on the electronic device 104, a control system can randomly generate a verification password, and send the verification password to the electronic device 104 and the user.

Therefore, the user can input, based on the received verification password, the verification password by using the input/output unit 101 disposed on the electronic device 104, and the verification unit 102 verifies the verification password input by the user.

Further, for example, the electronic device 104 is a server. To facilitate management and ensure resource utilization, a plurality of electronic devices 104 are usually disposed in the same server room. To further ensure resource utilization, each server is usually arranged to be a compact model, and is fixed in a predetermined frame. The panel provides an interface that interacts with the outside. To ensure a success rate of interaction, an interface disposed on a panel of the server has high usage in the panel. Consequently, there is no corresponding space in the server to deploy a corresponding input/output unit 101. In other words, only an input/output unit 101 that occupies small space needs to be disposed such that the input/output unit 101 can be disposed in the electronic device 104.

Under the constraint of the above-mentioned condition, the input/output unit 101 in this specification can be disposed as a single key.

In addition, since the noise in the server room is relatively loud, using a sound as a prompt message is highly disadvantageous. The input/output unit 101 can give a prompt to the user in a form of light.

Specifically, the input/output unit 101 is a single key with a light. In such case, when receiving different instructions, the input/output unit 101 can emit light of different colors to display different prompt information to the user.

The first instruction, the second instruction, and the third instruction described above are used as examples. After receiving the first instruction, the input/output unit 101 can display a first color based on the first instruction. The first color is used to indicate that the electronic device 104 in which the security verification device 100 is located needs to perform a physical operation.

After receiving the second instruction sent by the verification unit 102, the input/output unit 101 can display a second color based on the second instruction. The second color is used to prompt the user that a lock is successfully opened.

After receiving the third instruction sent by the verification unit 102, the input/output unit 101 can display a third color based on the third instruction. The third color is used to prompt the user that security verification fails.

Certainly, in addition to emitting light of different colors to display different prompt information, the input/output unit 101 can further display different prompt information by changing light flashing frequency.

Specifically, after receiving the first instruction, the input/output unit 101 can change the light flashing frequency to first frequency based on the first instruction. The first frequency is used to indicate that the electronic device 104 in which the security verification device 100 is located needs to perform a physical operation.

After receiving the second instruction sent by the verification unit 102, the input/output unit 101 changes the light flashing frequency to second frequency based on the second instruction. The second frequency is used to prompt the user that a lock is successfully opened.

After receiving the third instruction sent by the verification unit 102, the input/output unit 101 can change the light flashing frequency to third frequency based on the third instruction. The third frequency is used to prompt the user that security verification fails.

The specific method used by the input/output unit 101 to give a prompt to the user can be set based on needs, which is not limited in this specification.

Certainly, the above-mentioned input/output unit 101 displays prompt information based on an instruction, where the instruction can further include a feedback instruction, and the prompt information can further include feedback information.

In addition to being disposed as a key with a light, the input/output unit 101 can further be an apparatus including a key and a light. In other words, the light can be located inside or outside a key.

Based on the above-mentioned idea, for example, the first color is yellow, the second color is green, the third color is red, feedback of a dot of a Morse code is that the first color is staying lit for 0.2 s, and feedback of a dash of a Morse code is that the first color is staying lit for 0.5 s. In such case, the input/output unit 101 can turn on the light in yellow during an operation and maintenance time period of the electronic device 104, thereby prompting the user that the electronic device 104 in which the input/output unit 101 is located needs to perform a physical operation.

However, when the user presses the key, i.e., the input/output unit 101, the verification unit 102 starts timing and controls the input/output unit 101 so as to prompt the user that the input/output unit 101 has detected the user input.

When the user presses and holds the key and releases the input/output unit 101 within 0.5 s, the verification unit 102 can determine that the decoding corresponding to the user operation is a dot of a Morse code, and send feedback information of the dot of the Morse code to the input/output unit 101. The input/output unit 101 can display, based on the received feedback information of the dot of the Morse code, the yellow light stays lit for 0.2 s for one time and then turn off the light, providing feedback to the user for confirming that the dot of the Morse code is received.

When the user presses and holds the input/output unit 101 for more than 1 s, and then releases the input/output unit 101, the verification unit 102 can determine that the decoding corresponding to the user operation is a dash of a Morse code, and send feedback information of the dash of the Morse code to the input/output unit 101. The input/output unit 101 can display, based on the received feedback information of the dash of the Morse code, the yellow light stays lit for 0.5 s for one time and then turn off the light, providing feedback to the user for confirming that the dash of the Morse code is received.

After the yellow light is turned off, the user can input a subsequent Morse code within 3 seconds. The above-mentioned steps are repeated to complete the related password input.

Still further, a length of the verification password is limited. Generally, if the user does not perform any operation on the input/output unit 101 in a time period after the user performs an operation on the input/output unit 101, or the user short presses a confirmation key, it can be considered that the user input is completed. However, when the input/output unit 101 in this specification is only a single key, the verification unit 102 can determine, based on a moment at which the user performs an operation on the input/output unit 101, whether the user input has been completed.

Specifically, when duration between a moment corresponding to the most recent reception of the electrical signal and a current moment exceeds predetermined duration, the verification unit 102 can determine that the user input is completed, and determine the Morse code of the user based on each received electrical signal.

For example, the predetermined duration is 3 s. When the user stays still for more than 3 seconds after completing the input of one group of passwords, the verification unit 102 can consider that the user completes the input by default, i.e., can generate a Morse code and verify the Morse code. If the verification succeeds, the input/output unit 101 displays the green light for 3 seconds, indicating that the user request is accepted. If the verification fails, the input/output unit 101 displays the red light for 3 seconds, indicating that the user request is rejected.

In addition, to ensure that when the electronic device 104 is powered off, the security verification device 100 can further continue to perform security verification, a battery unit 106 can be further deployed in the security verification device 100, and the battery unit 106 supplies power to the input/output unit 101 and the verification unit 102.

Still further, in practice, because of a factor such as poor contact or a delay of a sensor 107, the verification unit 102 may not receive, in a timely manner, the Morse code input by the user, or the user performs a physical operation on the electronic device 104 before the verification of the Morse code input by the user is completed.

Therefore, in this specification, the sensor 107 can be further disposed in the locking mechanism 103.

Therefore, the sensor 107 can monitor whether the locking mechanism 103 is being released when the locking mechanism 103 does not receive a release instruction. If it is detected that the locking mechanism 103 is being released, the sensor 107 can send an alert signal to the verification unit 102.

The verification unit 102 can receive the alert signal, and after receiving the alert signal, determine whether a Morse code that matches the verification password corresponding to the locking mechanism 103 is received.

If the Morse code that matches the verification password corresponding to the locking mechanism 103 is received, the verification unit 102 can send the release instruction to the locking mechanism 103. If the Morse code that matches the verification password corresponding to the locking mechanism 103 is not received, the verification unit 102 can send a fourth instruction to the input/output unit 101.

Therefore, the input/output unit 101 can display a fourth prompt message based on the fourth instruction. The fourth prompt message is used to prompt the user to perform an operation on the input/output unit 101.

Still further, the electronic device 104 generally includes a plurality of modules. For example, the electronic device 104 is a server, and the modules in the electronic device 104 can be a memory bank, a hard disk, and the like. For example, the electronic device 104 is a switch, and the modules in the electronic device 104 can be modules for storing data in the electronic device 104. Therefore, for each module, a locking mechanism 103 corresponding to the module can be deployed in the module. Clearly, opening a housing of the electronic device 104 to remove dust from the electronic device 104 is quite different from removing a hard disk of the electronic device 104 in terms of a degree of impact on information security.

Therefore, a plurality of verification passwords corresponding to the electronic device 104 can be set in the verification device, and different verification passwords correspond to different locking mechanisms 103.

Therefore, after determining the Morse code input by the user, the verification unit 102 can perform matching based on the Morse code input by the user and the verification passwords pre-stored in the verification unit 102, and determine the verification password that matches the Morse code as the specified verification password.

After determining the specified verification password, the verification unit 102 can determine the locking mechanism 103 corresponding to the specified verification password, and send a release instruction to the locking mechanism 103 corresponding to the specified verification password.

After receiving the release instruction, the locking mechanism 103 can release physical locking of the module corresponding to the locking mechanism 103.

Still further, the verification unit 102 communicates with the input/output unit 101 by using a circuit, and a random electrical signal or the like may be generated in the circuit. Consequently, when the input/output unit 101 fails to detect an operation of the user, the verification unit 102 receives an incorrect signal, and verifies the signal by using the signal as an input operation of the user. Therefore, to avoid occurrence of the above-mentioned situation, the verification unit 102 can further perform de-jitter processing to filter out burrs caused by contact transients. It is assumed that a reaction limit of the human body is 0.1 s, and then the verification unit 102 can filter out burr peaks below 0.03 s and 0.05 s so as to improve system stability and reliability.

Figure 3:
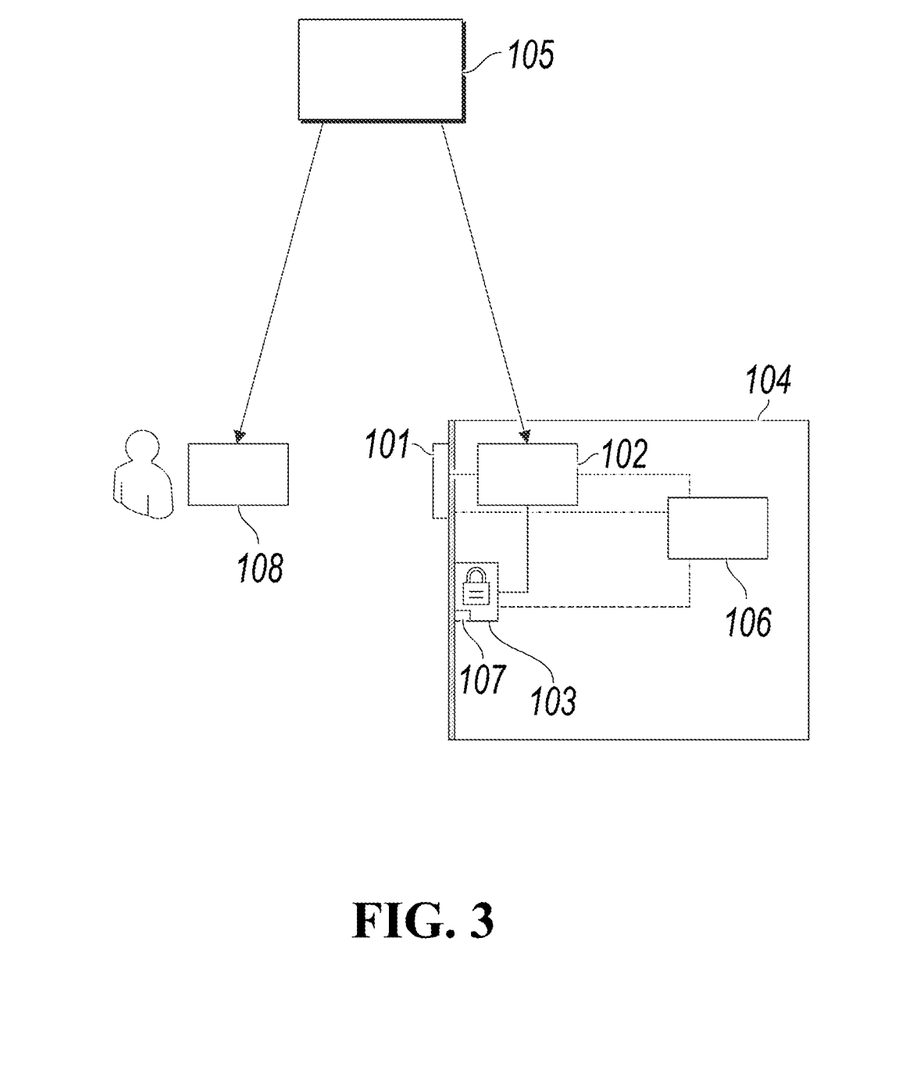
FIG. 3 is a schematic structural diagram illustrating a security verification system, according to this specification.

Based on the same idea, this specification further provides a schematic structural diagram illustrating a security verification system, as shown in FIG. 3.

FIG. 3 is a schematic structural diagram illustrating a security verification system, according to this specification. In the figure, 101 represents an input/output unit, 102 represents a verification unit, 103 represents a locking mechanism, 104 represents an electronic device, 105 represents a central control device, 106 represents a battery unit, 107 represents a sensor in a locking mechanism, 108 represents a handheld terminal device of a user, a solid line represents a connection relationship, and a dotted line represents that the battery unit supplies power to the input/output unit, the locking mechanism, and the verification unit. The central control device 105 can send a verification instruction to the verification unit 102, and send a maintenance instruction to a terminal device of the user, so as to prompt the user to perform an input operation based on the maintenance instruction.

The central control device can send the verification password to the verification unit based on a predetermined specified time period and the verification password corresponding to the electronic device, and send, to a user, a maintenance instruction that includes the verification password, so as to prompt the user to perform a physical operation on the electronic device based on the verification password in the specified time period. Sending a maintenance instruction to the user can be sending a maintenance instruction to a handheld terminal device 108 of the user, so as to prompt the user to perform an operation on the input/output unit based on the maintenance instruction.

The verification unit can determine and store the verification password of the electronic device based on the received verification instruction sent by the central control device.

The input/output unit can determine, in response to an operation performed by the user on the input/output unit, an electrical signal corresponding to the operation, and send the determined electrical signal to the verification unit.

The verification unit can determine, based on the received electrical signal, a Morse code input by the user, and verify the Morse code based on a pre-stored verification password corresponding to the electronic device.

If the verification succeeds, the verification unit can send a release instruction to the locking mechanism such that the locking mechanism releases physical locking of the electronic device based on the release instruction.

It is worthwhile to note that the above-mentioned illustration is merely an example description of the security verification system, and the security verification system can further use other technical methods, for example, technical methods for prompting the user to perform an operation on the input/output unit based on the maintenance instruction, or a plurality of means such as disposing a display screen for displaying maintenance information at a work station of the user, or manual notification. A specific device included in the security verification system can be set based on needs, which is not limited in this specification.

Figure 4:
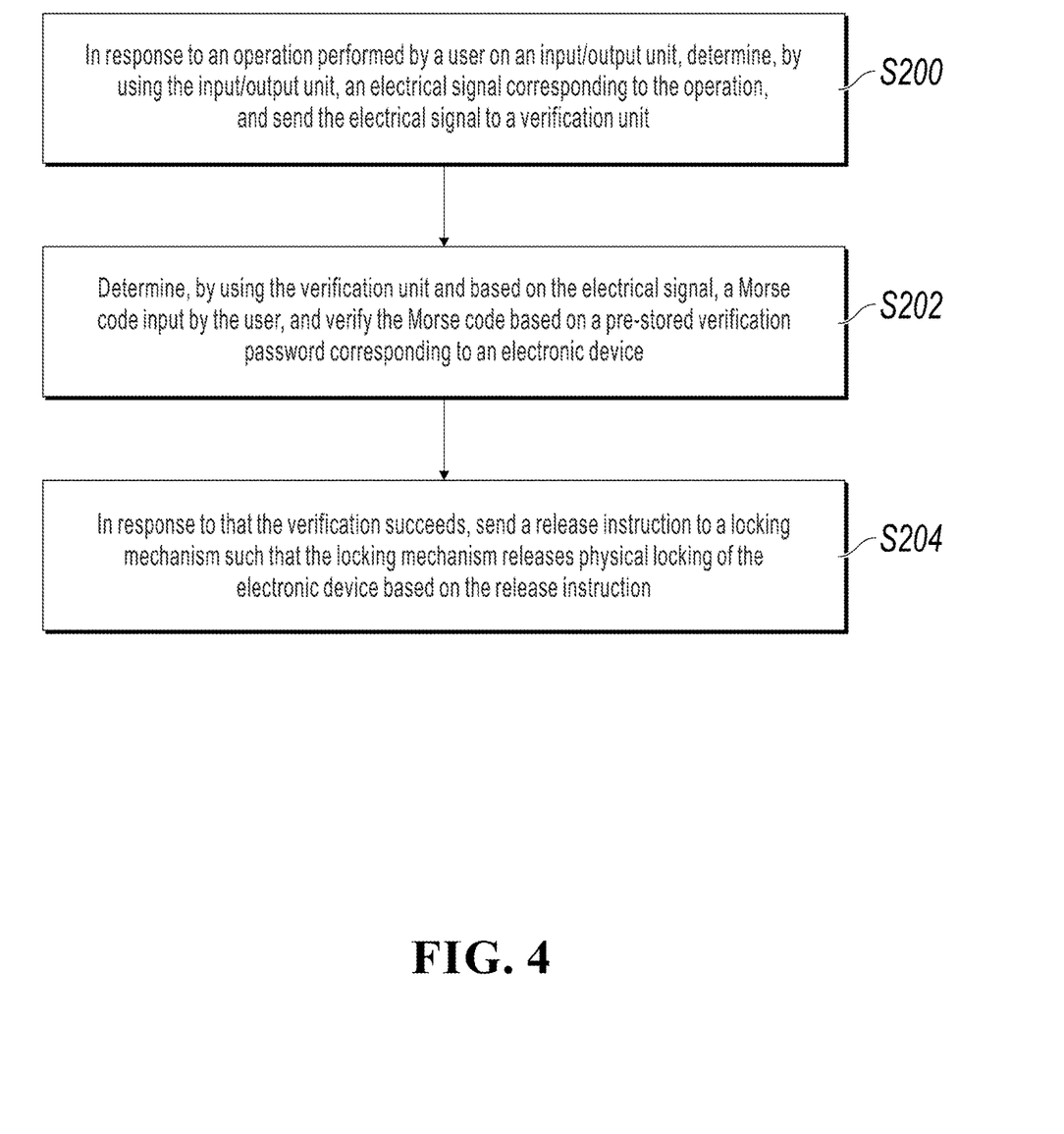
FIG. 4 is a schematic flowchart illustrating a security verification method, according to this specification.

Based on the same idea, this specification further provides a security verification method, as shown in FIG. 4.

FIG. 4 is a schematic flowchart illustrating a security verification method, according to this specification. The security verification method is applied to a security verification device, the security verification device is deployed in an electronic device, the security verification device includes an input/output unit and a verification unit, the input/output unit is deployed on a front panel of the electronic device, the verification unit is deployed in the electronic device, and a locking mechanism is deployed in the electronic device.

S200: In response to an operation performed by a user on the input/output unit, determine, by using the input/output unit, an electrical signal corresponding to the operation, and send the electrical signal to the verification unit.

S202: Determine, by using the verification unit and based on the electrical signal, a Morse code input by the user, and verify the Morse code based on a pre-stored verification password corresponding to the electronic device.

S204: In response to that the verification succeeds, send a release instruction to the locking mechanism such that the locking mechanism releases physical locking of the electronic device based on the release instruction.

In one or more embodiments provided in this specification, the security verification method is performed by a security verification device. For a specific execution process of the security verification method, references can be made to the above-mentioned description of the security verification device, and details are omitted for simplicity in this specification.

Figure 5:
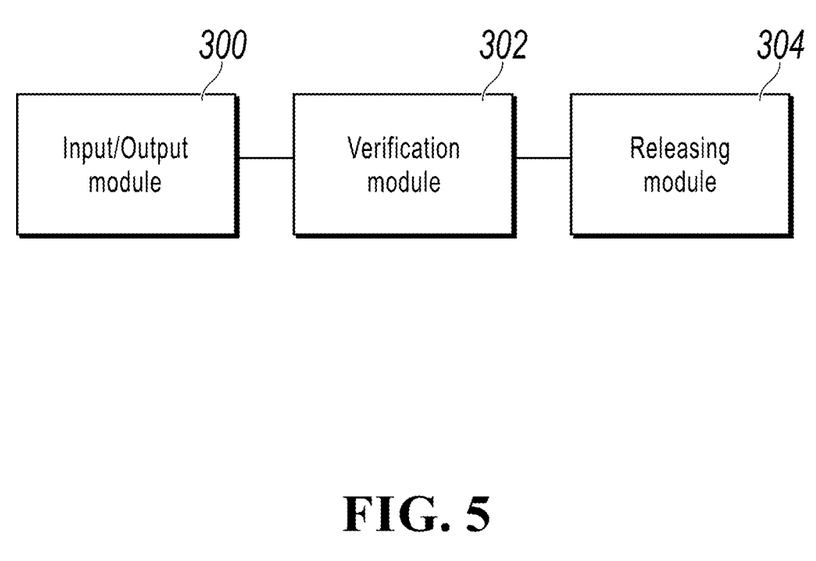
FIG. 5 is a schematic structural diagram illustrating a security verification apparatus, according to this specification.

Based on the same idea, this specification further provides a security verification apparatus, as shown in FIG. 5.

FIG. 5 is a schematic structural diagram illustrating a security verification apparatus, according to this specification. The security verification apparatus is applied to a security verification device, the security verification device is deployed in an electronic device, the security verification device includes an input/output unit and a verification unit, the input/output unit is deployed on a front panel of the electronic device, the verification unit is deployed in the electronic device, and a locking mechanism is deployed in the electronic device. The apparatus includes: an input/output module 300, configured to: in response to an operation performed by a user on the input/output unit, determine, by using the input/output unit, an electrical signal corresponding to the operation, and send the electrical signal to the verification unit; a verification module 302, configured to determine, by using the verification unit and based on the electrical signal, a Morse code input by the user, and verify the Morse code based on a pre-stored verification password corresponding to the electronic device; and a releasing module 304, configured to: in response to that the verification succeeds, send a release instruction to the locking mechanism such that the locking mechanism releases physical locking of the electronic device based on the release instruction.

This specification further provides a computer-readable storage medium, where the storage medium stores a computer program, and the computer program can be used to perform the above-mentioned security verification method provided in FIG. 1.

Figure 6:
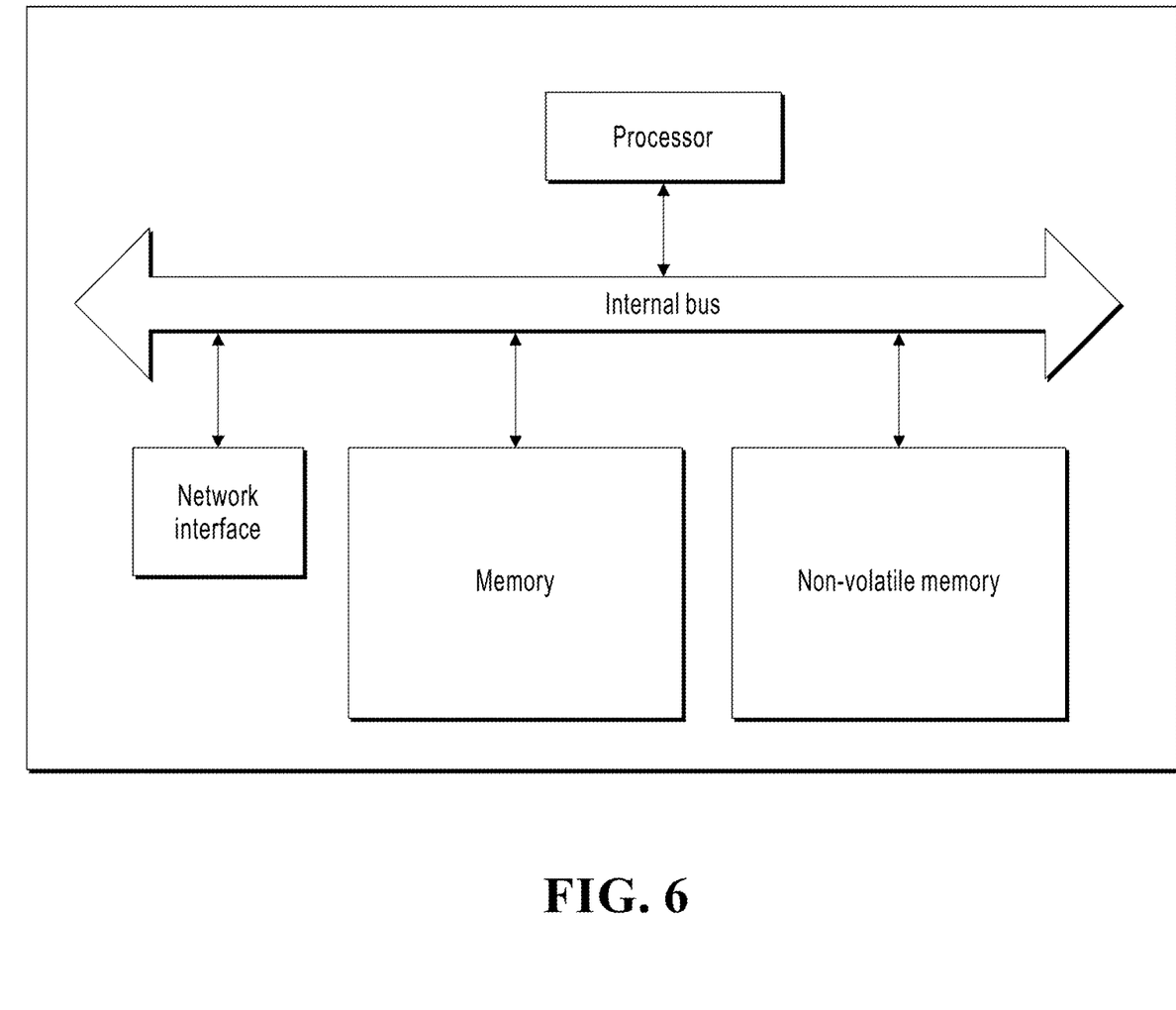
FIG. 6 is a schematic diagram illustrating an electronic device corresponding to FIG. 1, according to this specification.

This specification further provides a schematic structural diagram illustrating an electronic device shown in FIG. 6. As shown in FIG. 6, at the hardware level, the electronic device includes a processor, an internal bus, a network interface, a memory, and a non-volatile memory, and certainly may further include other hardware needed by a service. The processor reads a corresponding computer program from the non-volatile memory to the memory and then runs the computer program to implement the above-mentioned security verification method shown in FIG. 1. Certainly, in addition to software implementations, this specification does not preclude other implementations, such as a logic device or a combination of software and hardware. In other words, an execution body of the following processing procedure is not limited to each logical unit, and can be hardware or a logic device.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in some embodiments described above can be implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when this specification is implemented, a function of each unit can be implemented in one or more pieces of software and/or hardware.

A person skilled in the art should understand that some embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable security verification device to generate a machine such that the instructions executed by the computer or the processor of the another programmable security verification device generate an apparatus for implementing a specific function in one or more processes in the flowcharts and/or in one or more blocks in the block diagrams.

These computer program instructions can be stored in a computer-readable memory that can instruct the computer or the another programmable security verification device to work in a specific way such that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or the another programmable security verification device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a module of a program or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which can be configured to store information that can be physically operated by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification can be described in the general context of computer-executable instructions to be executed by a computer, for example, a program module. Generally, the program module includes a routine, a program, a key-value pair, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

Some embodiments of this specification are described in a progressive way. For same or similar parts of some embodiments, mutual references can be made to the embodiments. Each embodiment focuses on a difference from other embodiments. Particularly, some system embodiments are briefly described since they are basically similar to some method embodiments. For related parts, references can be made to related descriptions in some method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A security verification device, wherein the security verification device is deployed in an electronic device, the security verification device comprising:
   an input/output apparatus; and
   a verification apparatus,
   wherein:
   the input/output apparatus is deployed on a front panel of the electronic device,
   the verification apparatus is deployed in the electronic device, wherein a locking mechanism is deployed in the electronic device,
   wherein:
   the input/output apparatus is configured to:
      in response to an operation performed by a user on the input/output apparatus, determine an electrical signal corresponding to the operation; and
      send the electrical signal to the verification apparatus; and
   the verification apparatus is configured to:
      determine, based on the electrical signal, a Morse code input by the user; and
      perform a verification of the Morse code based on a pre-stored verification password corresponding to the electronic device; and
      in response to that the verification succeeds, send a release instruction to the locking mechanism to instruct the locking mechanism to release physical locking of the electronic device based on the release instruction.

2. The security verification device according to claim 1, wherein the input/output apparatus is a single key;
   the input/output apparatus is configured to generate an electrical signal of a first voltage level when the user performs an operation on the single key, and send the electrical signal of the first voltage level to the verification apparatus in response to the operation performed by the user on the single key; and
   the verification apparatus is configured to receive the electrical signal of the first voltage level sent by the input/output apparatus, and determine a Morse code corresponding to the electrical signal based on duration of the electrical signal of the first voltage level.

3. The security verification device according to claim 1, wherein the verification apparatus is further configured to send a feedback instruction to the input/output apparatus based on a type of the Morse code corresponding to the electrical signal; and
   the input/output apparatus is further configured to receive the feedback instruction sent by the verification apparatus, and display a feedback message based on the feedback instruction, wherein the feedback message is used to prompt the user of the type of the Morse code corresponding to the operation.

4. The security verification device according to claim 1, wherein the input/output apparatus is a single key with a light; and
   the light is configured to emit light of different colors, and the light of different colors represents different prompt messages.

5. The security verification device according to claim 1, wherein the verification apparatus is further configured to: before verifying the Morse code, receive and store a verification password from a central control device, and send a first instruction to the input/output apparatus based on the verification password received from the central control device; and
   the input/output apparatus is configured to receive the first instruction sent by the verification apparatus, and display a first prompt message based on the first instruction, wherein the first prompt message is used to prompt the user that the electronic device needs a physical operation to be performed.

6. The security verification device according to claim 5, wherein the verification apparatus is further configured to receive and store a specified time period from the central control device, and send the first instruction to the input/output apparatus in response to determining that a current moment reaches a start moment of the specified time period; and
   the input/output apparatus is configured to display the first prompt message based on the first instruction, wherein the first prompt message is used to prompt the user that the electronic device needs the physical operation to be performed.

7. The security verification device according to claim 1, wherein the verification apparatus is further configured to: in response to that the verification succeeds, send a second instruction to the input/output apparatus; or in response to that the verification fails, send a third instruction to the input/output apparatus; and the input/output apparatus is further configured to: receive the second instruction sent by the verification apparatus, and display a second prompt message based on the second instruction, wherein the second prompt message is used to prompt the user that the verification succeeds; or receive the third instruction sent by the verification apparatus, and display a third prompt message based on the third instruction, wherein the third prompt message is used to prompt the user that the verification fails.

8. The security verification device according to claim 1, wherein the electronic device comprises a plurality of modules, one locking mechanism is deployed in each module, the verification apparatus stores a plurality of verification passwords, and different verification passwords correspond to different locking mechanisms, wherein:
the verification apparatus is configured to separately perform matching between the Morse code and the plurality of verification passwords, and determine a verification password that matches the Morse code as a specified verification password; and send a release instruction to a target locking mechanism corresponding to the specified verification password to instruct the target locking mechanism receiving the release instruction to release locking of a module corresponding to the target locking mechanism.

9. The security verification device according to claim 1, wherein a battery apparatus is deployed in the security verification device; and
the battery apparatus is configured to supply power to the input/output apparatus, the verification apparatus, and the locking mechanism when the electronic device is powered off.

10. The security verification device according to claim 1, wherein the locking mechanism comprises a sensor, and the sensor is configured to: when the locking mechanism does not receive the release instruction, monitor whether the locking mechanism is being released; and in response to that the locking mechanism is being released, send an alert signal to the verification apparatus;
the verification apparatus is further configured to: receive the alert signal, and determine whether a Morse code that matches a verification password corresponding to the locking mechanism is received; and in response to that the Morse code that matches the verification password corresponding to the locking mechanism is not received, send a fourth instruction to the input/output apparatus; and
the input/output apparatus is further configured to receive the fourth instruction sent by the verification apparatus, and display a fourth prompt message based on the fourth instruction, wherein the fourth prompt message is used to prompt the user to perform an operation on the input/output apparatus.

11. A computer-implemented method for security verification performed by a security verification device that comprises an input/output apparatus and a verification apparatus, wherein the input/output apparatus is deployed on a front panel of an electronic device, the verification apparatus is deployed in the electronic device, and a locking mechanism is deployed in the electronic device, the computer-implemented method comprising:
in response to an operation performed by a user on the input/output apparatus, determining, by the input/output apparatus, an electrical signal corresponding to the operation;
sending, by the input/output apparatus, the electrical signal to the verification apparatus;
determining, by the verification apparatus and based on the electrical signal, a Morse code input by the user;
performing, by the verification apparatus, a verification of the Morse code based on a pre-stored verification password corresponding to the electronic device; and
in response to that the verification succeeds, sending, by the verification apparatus, a release instruction to the locking mechanism to instruct the locking mechanism to release physical locking of the electronic device based on the release instruction.

12. The computer-implemented method according to claim 11, wherein the input/output apparatus is a single key, and the computer-implemented method comprises:
generating, by the input/output apparatus, an electrical signal of a first voltage level when the user performs an operation on the single key;
sending, by the input/output apparatus, the electrical signal of the first voltage level to the verification apparatus in response to the operation performed by the user on the single key;
receiving, by the verification apparatus, the electrical signal of the first voltage level sent by the input/output apparatus, and
determining, by the verification apparatus, a Morse code corresponding to the electrical signal based on duration of the electrical signal of the first voltage level.

13. The computer-implemented method according to claim 11, further comprising:
sending, by the verification apparatus, a feedback instruction to the input/output apparatus based on a type of the Morse code corresponding to the electrical signal; and
receiving, by the input/output apparatus, the feedback instruction sent by the verification apparatus; and
displaying, by the input/output apparatus, a feedback message based on the feedback instruction, wherein the feedback message is used to prompt the user of the type of the Morse code corresponding to the operation.

14. The computer-implemented method according to claim 11, further comprising:
before verifying the Morse code, receiving and storing, by the verification apparatus, a verification password from a central control device;
sending, by the verification apparatus, a first instruction to the input/output apparatus based on the verification password received from the central control device;
receiving, by the input/output apparatus, the first instruction sent by the verification apparatus; and
displaying, by the input/output apparatus, a first prompt message based on the first instruction, wherein the first prompt message is used to prompt the user that the electronic device needs a physical operation to be performed.

15. The computer-implemented method according to claim 14, further comprising:
receiving and storing, by the verification apparatus, a specified time period from the central control device;
sending, by the verification apparatus, the first instruction to the input/output apparatus in response to determining that a current moment reaches a start moment of the specified time period; and
displaying, by the input/output apparatus, the first prompt message based on the first instruction, wherein the first prompt message is used to prompt the user that the electronic device needs the physical operation to be performed.

16. The computer-implemented method according to claim 11, wherein the computer-implemented method comprises:

in response to that the verification succeeds, sending, by the verification apparatus, a second instruction to the input/output apparatus; or in response to that the verification fails, sending, by the verification apparatus, a third instruction to the input/output apparatus; and receiving, by the input/output apparatus, the second instruction sent by the verification apparatus, and displaying, by the input/output apparatus, a second prompt message based on the second instruction, wherein the second prompt message is used to prompt the user that the verification succeeds; or receiving, by the input/output apparatus, the third instruction sent by the verification apparatus, and displaying, by the input/output apparatus, a third prompt message based on the third instruction, wherein the third prompt message is used to prompt the user that the verification fails.

17. The computer-implemented method according to claim 11, wherein the electronic device comprises a plurality of modules, one locking mechanism is deployed in each module, the verification apparatus stores a plurality of verification passwords, and different verification passwords correspond to different locking mechanisms, and wherein the computer-implemented method comprises:

separately performing, by the verification apparatus, matching between the Morse code and the plurality of verification passwords;

determining, by the verification apparatus, a verification password that matches the Morse code as a specified verification password; and sending, by the verification apparatus, a release instruction to a target locking mechanism corresponding to the specified verification password to instruct the target locking mechanism receiving the release instruction to release locking of a module corresponding to the target locking mechanism.

18. A computer-implemented system for security verification, comprising:

a security verification device, wherein the security verification device comprises an input/output apparatus and a verification apparatus, and a central control device, wherein the central control device is configured to stores a verification password corresponding to an electronic device, the central control device communicates with the verification apparatus in the security verification device, wherein the input/output apparatus is deployed on a front panel of the electronic device, the verification apparatus is deployed in the electronic device, and a locking mechanism is deployed in the electronic device, wherein the central control device is configured to:
send the verification password to the verification apparatus based on a specified time period and the verification password corresponding to the electronic device, and send, to a user, a maintenance instruction that comprises the verification password to prompt the user to perform a physical operation on the electronic device based on the verification password in the specified time period, wherein the verification apparatus is configured to:
receive and store the verification password from the central control device;

determine, based on a received electrical signal, a Morse code input by the user, and perform a verification of the Morse code based on the verification password corresponding to the electronic device; and in response to that the verification succeeds, send a release instruction to the locking mechanism to instruct the locking mechanism to release physical locking of the electronic device based on the release instruction; and wherein the input/output apparatus is configured to:
in response to an operation performed by the user on the input/output apparatus, determine an electrical signal corresponding to the operation, and send the electrical signal to the verification apparatus.

19. The computer-implemented system according to claim 18, wherein a battery apparatus is deployed in the security verification device; and the battery apparatus is configured to supply power to the input/output apparatus, the verification apparatus, and the locking mechanism when the electronic device is powered off.

20. The computer-implemented system according to claim 18, wherein the locking mechanism comprises a sensor, and the sensor is configured to: when the locking mechanism does not receive the release instruction, monitor whether the locking mechanism is being released; and in response to that the locking mechanism is being released, send an alert signal to the verification apparatus;

the verification apparatus is further configured to: receive the alert signal, and determine whether a Morse code that matches a verification password corresponding to the locking mechanism is received; and in response to that the Morse code that matches the verification password corresponding to the locking mechanism is not received, send a fourth instruction to the input/output apparatus; and the input/output apparatus is further configured to receive the fourth instruction sent by the verification apparatus, and display a fourth prompt message based on the fourth instruction, wherein the fourth prompt message is used to prompt the user to perform an operation on the input/output apparatus.

* * * * *